(12) United States Patent
Bavoux et al.

(10) Patent No.: US 8,230,727 B2
(45) Date of Patent: Jul. 31, 2012

(54) SENSOR STRUCTURE IN PARTICULAR FOR A HARSH ENVIRONMENT IN A MOTOR VEHICLE

(75) Inventors: Bernard Bavoux, Bures/Yvette (FR); Maxime Pauly, Bertrange (FR); Ida Elsa Meneguz, legal representative, Bertrange (FR); Rémy Pauly, legal representative, Bertrange (FR); Jean-Sébastien Danel, Echirolles (FR); Philippe Robert, Grenoble (FR)

(73) Assignees: Commissariat a l'Energie Atomique (FR); Peugeot Citroen Automobiles S.A. (FR)

( * ) Notice: Subject to any disclaimer, the term of this patent is extended or adjusted under 35 U.S.C. 154(b) by 919 days.

(21) Appl. No.: 11/917,760

(22) PCT Filed: Jun. 15, 2006

(86) PCT No.: PCT/EP2006/063250
§ 371 (c)(1),
(2), (4) Date: Sep. 23, 2008

(87) PCT Pub. No.: WO2006/134151
PCT Pub. Date: Dec. 12, 2006

(65) Prior Publication Data
US 2009/0038386 A1 Feb. 12, 2009

(30) Foreign Application Priority Data
Jun. 15, 2005 (FR) .................................. 05 06083

(51) Int. Cl.
*G01M 15/00* (2006.01)
(52) U.S. Cl. .................................................... 73/114.18
(58) Field of Classification Search ................ 73/431, 73/866.5, 114.18; 340/447
See application file for complete search history.

(56) References Cited

U.S. PATENT DOCUMENTS

| 8,047,067 B2 * | 11/2011 | Bavoux et al. | 73/118.01 |
| 2004/0105342 A1 | 6/2004 | Gardner et al. | |
| 2006/0244581 A1 * | 11/2006 | Breed et al. | 340/447 |
| 2006/0272402 A1 * | 12/2006 | Yin et al. | 73/146.8 |
| 2008/0074251 A1 * | 3/2008 | Marguet et al. | 340/447 |

FOREIGN PATENT DOCUMENTS

| DE | 4341903 A1 | 6/1995 |
| GB | 2119127 A | 11/1983 |
| WO | WO 02/23145 A2 | 3/2002 |

* cited by examiner

*Primary Examiner* — Lisa Caputo
*Assistant Examiner* — Jamel Williams
(74) *Attorney, Agent, or Firm* — Lowe Hauptman Ham & Berner, LLP

(57) ABSTRACT

A sensor structure is disclosed, notably for a harsh environment in a motor vehicle. The sensor includes a sensor body having, at one end, an element sensitive to the quantity to be measured in the harsh environment and, at another end, a circuit for connecting it, placed outside the harsh environment, physically separated from each other, connected by means for transmitting data without a connection, and between which means are provided that are permeable to data, for protecting the connecting circuit from the environment.

20 Claims, 3 Drawing Sheets

SENSOR STRUCTURE IN PARTICULAR FOR A HARSH ENVIRONMENT IN A MOTOR VEHICLE

CROSS-REFERENCE TO RELATED APPLICATIONS

The present Application is based on International Application No. PCT/EP2006/063250, filed on Jun. 15, 2006, which in turn corresponds to French Application No. 05 06083, filed on Jun. 15, 2005, and priority is hereby claimed under 35 USC §119 based on these applications. Each of these applications are hereby incorporated by reference in their entirety into the present application.

TECHNICAL FIELD

The present invention relates to a sensor structure, notably for a harsh environment in a motor vehicle.

BACKGROUND OF THE INVENTION

A principal problem encountered in this type of application is to be able to carry out measurements in a harsh environment, for which conventional sensor technologies cannot be used by reason of the harsh environmental conditions encountered, whether these be thermal, vibratory, chemical, etc. environmental conditions.

One approach used up to now to carry out such a measurement in such a difficult environment is to insert a transducer between the quantity to be measured and the measuring device, so that at the end of the transducer the environmental conditions are compatible with the technology of the sensor.

The function of the transducer is therefore to form a screen for some physical components that interfere with or are incompatible with the sensor, while being a transmitter of the quantity to be measured.

However, the use of this transducer presents a certain number of disadvantages, in particular by reason of deformations, loss or addition of data, etc. that this can produce.

These distortions are characterized for example by imperfections in amplitude (lack of precision or saturation) and/or in the dynamic domain (limited pass-band in low and/or high frequency).

An example of such a measurement in a harsh environment concerns the measurement of cylinder pressure in an internal combustion engine of a motor vehicle.

Measurement of such a cylinder pressure in an engine is a new requirement. It then consists of measuring, during various engine cycles (induction, compression, combustion, exhaust), the pressure variation of gases in order to optimize the control of injection and ignition in order to obtain better performance and therefore to reduce pollution.

However, the temperature varies during engine cycles from ambient temperature when the engine is at rest to several hundreds of degrees C., while being aware that the flame in the cylinder is at approximately 1800° C. Now, a certain number of materials used for sensors do not withstand such temperatures. This is for example the case with materials such as silicon that are normally used for such pressure measurements.

It has then been proposed to include the cylinder pressure sensor in a preheating plug, for example for diesel engines. The point of the plug is then situated at the top of the cylinder in contact with the flame. It is used as a transducer in order to compress, at the other end of the plug, a sensor that is located in a tempered environment in contact with the cylinder head of the engine cooled by water circulation for example.

However, transduction performed by the point of the preheating plug is subject to mechanical inertia (mass of the transducer) and, depending on the devices used, presents problems of leakproofness, as well as precision problems in low pressure values and/or it is sensitive to vibrations.

One variant of an embodiment of this assembly also consists of including the cylinder pressure sensor in the preheating plug, but differs from the preceding solution in that the fixing device gives support to the pressure transducer either side of the thickness of the cylinder head. Deformation of the cylinder head is then measured under the effect of pressure.

However, this measurement depends on the torque with which the preheating plug has been tightened in the cylinder head. Moreover, it detects vibrational modes of the cylinder head that are superimposed on the required signal. Finally, the measured signal is affected by the transfer function that depends on the cylinder head and its environment.

Another solution consists of using one or more optical fibers in order to detect the reflection of a light ray by a membrane subjected to pressure and temperature.

The optical fiber then conveys this data in a tempered location where electronics for acquiring and processing the signal are located.

However, the optical fiber also has temperature resistance limits. The membrane on which the light ray is reflected determines the quality of measurements. Its definition should take account of the mechanical characteristics (natural vibrational mode), and thermal characteristics (expansion deforming the membrane), problems of the mechanical aging of the membrane, problems of oxidation on its reflecting face, etc.

Moreover, the emergence of telecommunication technologies has been encountered, making it possible to communicate data and/or to supply power remotely to associated electronic devices.

Thus, for example, such means are used for measuring the pressure of a tire.

It is in fact difficult to lead electrical connections into a rotating part. A pressure sensor connected to the tire then experiences communication difficulties with the vehicle by reason of its movements in relation to this.

One solution consists of including a sensor with self-contained power supply inside the tire and a transmitter/receiver inside the vehicle. The sensor can then communicate by a radio frequency connection with the transmitter/receiver. In some devices, the sensor can also be remotely supplied by induction or by radio frequency.

Such a structure can also be used to provide temperature measurements in an oven.

In point of fact, it is difficult to lead electrical connections into an environment that is too hot, connections employing for example soldered joints being sensitive to this type of environment, in as much as for example such soldered joints can melt.

Use is also made in the automotive industry field of radio frequency means of communication for antitheft devices on vehicles.

Thus for example, an identification device can be incorporated into a key of the motor vehicle, this device not needing a supply in order to reduce maintenance to a minimum.

It is also possible to include a device, in the key, that, in response to a radio frequency signal, sends back a signal carrying data that is specific to the key. This device is then supplied by means of the power of the electromagnetic signal received.

Other examples using radio frequency means of communication for radio frequency identification of the RFID type employ passive or active chips combining power collection, processor, memory and radio frequency communication and are being developed on a large scale for identifications.

SUMMARY OF THE INVENTION

An object of the invention is to provide a sensor structure that is well suited to use in a harsh environment in a motor vehicle.

To this end, the subject of the invention is a sensor structure, notably for a harsh environment in a motor vehicle, characterized in that it comprises a sensor body having, at one end, an element sensitive to the quantity to be measured in the harsh environment and, at another end, a circuit for connecting it, placed outside the harsh environment, physically separated from each other, connected by wireless means for transmitting data, and between which means are provided that are permeable to data, for protecting the connecting circuit from the environment.

According to other features of the invention:
the means for transmitting data additionally include means for remotely supplying the sensitive element, incorporated into the connecting circuit;
the means for transmitting data comprise means for transmitting/receiving data by a radioelectric route or by electromagnetic coupling;
the sensitive element is a pressure-sensitive element;
the sensitive element is a temperature-sensitive element;
the sensitive element is made of a piezoelectric material;
the sensitive element is based on aluminum nitride;
the sensitive element can be sensitive to other physical or chemical quantities (for example gas, vibration, acceleration, impacts etc.).

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will become apparent with the aid of the description which follows in conjunction with the appended drawings which represent.

DETAILED DESCRIPTION OF THE PREFERRED EMBODIMENT

Figure 1:
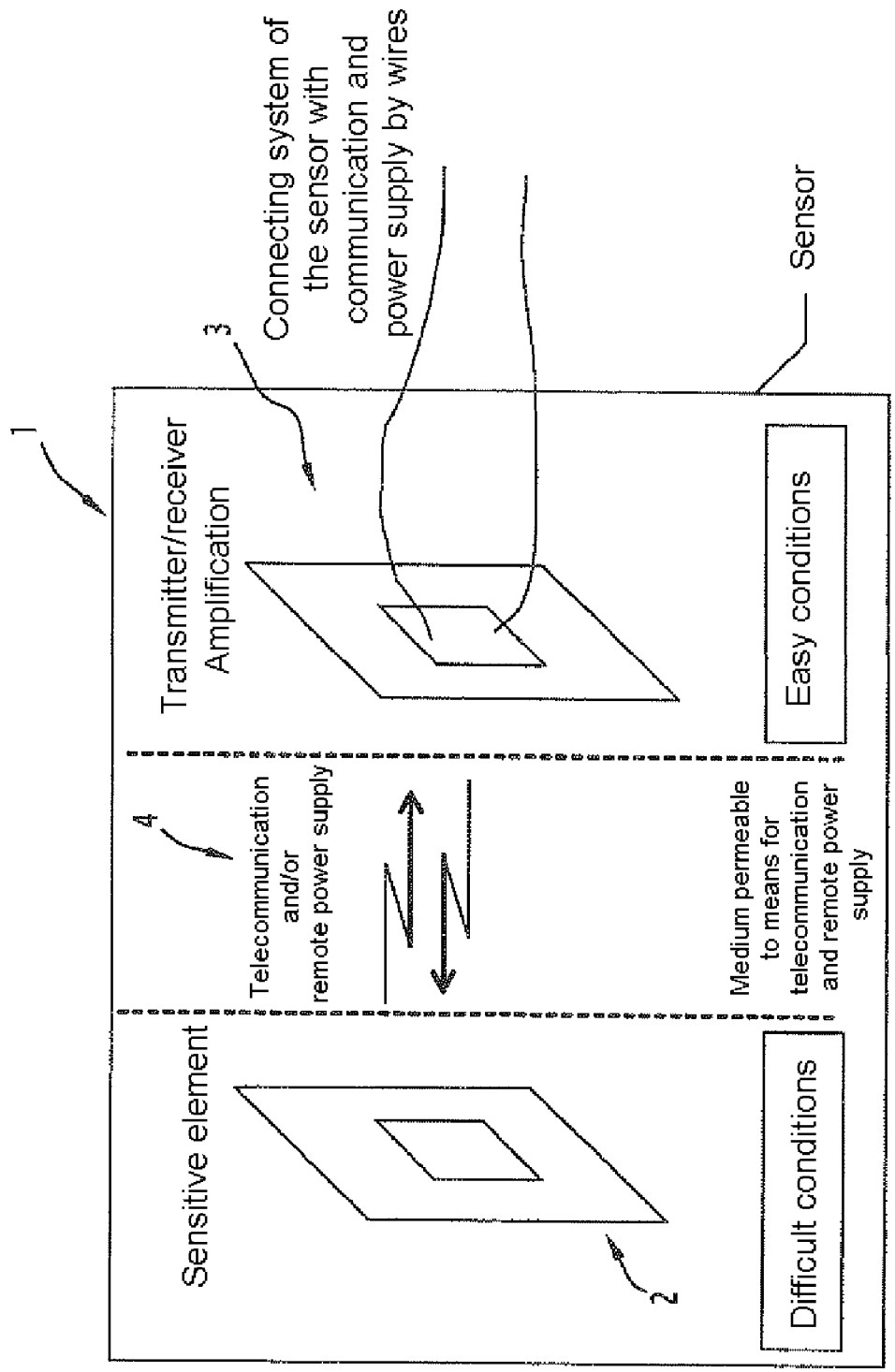
FIG. 1 shows a block diagram illustrating the general structure and operation of a sensor structure according to the invention.

In point of fact FIG. 1 illustrates a sensor structure, notably for a harsh environment in a motor vehicle.

It is known that schematically this sensor structure comprises a sensor body denoted by the general reference 1 in this figure, having at one end an element sensitive to the quantity to be measured, this sensitive element being denoted by the general reference 2.

This sensitive element is then placed in the harsh environment.

At the other end, this sensor body includes a connecting circuit denoted by the general reference 3, placed outside the harsh environment and physically separated from the sensitive element. On the other hand, this circuit 3 is connected by wireless data transmitting means to the sensitive element 2.

In point of fact, this circuit can for example include a data transmitter/receiver, or even means of amplification, making it possible to recover a signal from the sensitive element or even to supply the latter.

In this case, the means for transmitting/receiving data, or even means for remote power supply, that is to say supply from a distance, are incorporated into this circuit, for example in the form of a monoblock chip without a connection to its support.

Means are positioned between this connecting circuit 3 and the sensitive element 2, denoted by the general reference 4, that are permeable to data and are designed to provide protection for the connecting circuit against the harsh environment.

Thus, for example, means of thermal insulation can be envisaged between the sensitive element 2 and the circuit 3, that is to say between the two ends of the sensor body 1, in order to provide protection for the circuit 3.

A harsh environment is in fact an environment in which there is cumulated, in addition to the quantity to be measured, another quantity that is not compatible with an electronic measuring system having at least one electronic component with connections.

In such an environment, the electronics and its connections usually constitute a weak point. A connection is in fact a wire or a sheet making contact between two parts.

A metallizing layer of a printed circuit is not considered as a connection. A metallizing layer of an integrated circuit (as for example a chip in micro or nano technology etc.) is not considered as a connection either.

In the sensor structure according to the invention, the concept of a transducer, that is to say an element serving to transmit the data aimed at, such as for example pressure, to a sensor placed in a less harsh zone, is dispensed with, this transducer providing measurements as has been previously explained.

On the other hand, the sensitive element is placed in as close contact as possible with the physical quantity to be measured, in as far as the connecting circuit can itself be protected from the environment.

Thus, in the example described in relation to FIG. 1, the circuit that acts as a connection from the sensor to the outside, can also have means for transmitting/receiving data, for example by means of a radioelectric route or electromagnetic coupling, making it possible to recover the value of the quantity to be measured from the sensitive element.

Means for remotely supplying this sensitive element with power in a conventional manner can also be envisaged.

As has been previously indicated, this sensitive element can be an element sensitive to pressure or temperature.

In fact, this sensitive element can for example be made of a piezoelectric material, for example one based on aluminum nitride AlN.

In point of fact, the use of such a piezoelectric material in a sensitive element that resists a harsh environment, as for example AlN, withstands a high temperature and makes it possible to place it very close to the quantity to be measured.

Connections between the sensitive element of the sensor and its connecting circuit can then be eliminated and these connections replaced by a telecommunication device and possibly a remote power supply actually within the sensor. A remote power supply then makes it possible for the sensitive element to receive the necessary power for it to operate.

The use of means for protecting the circuit, permeable to means of telecommunication and of remote power supply between the sensitive element and the circuit, then makes it possible to protect this circuit and to place it in a secure environment.

It will be noted that these means of protection can for example consist of a layer of air or other material.

The means of telecommunication used can for example be similar to those already used in electronic tagging technology or RFID systems, in which the tag placed on an object emits a signal for identifying this object.

In the case of the structure of a sensor according to the invention, the signal is moreover a carrier for the measurement of the quantity.

The sensitive element 2, for example a chip based on micro or nano technology, constitutes an element of material in a single block that can be employed without a connection.

It will then be understood that, by means of such a structure, it is possible to solve problems connected with the melting point of the soldered joints of components, as well as the temperatures that can be withstood by connections between electronic chips and the connecting tabs thereof. Moreover, since no wire connection is used, the problem of the temperature resistance of cables and their insulating sheaths no longer exists.

In addition, this structure makes it possible to solve problems associated with vibrations, impacts and movements of connections, with the temperature resistance of electronic devices for measuring, processing, amplifying and supplying power and sealing means between the harsh environment and the part protected, where data must be conveyed.

In particular, the use of a material of the AlN type as a sensitive material presents a certain number of advantages, notably as regards the temperature resistance thereof. This material possesses piezoelectric properties up to a very high temperature, which makes it possible to operate without deterioration in an environment at a very high temperature.

Reference may be made for example to document WO-A2-02/23145 for the description of an example of a sensor using such a material.

Figure 2:
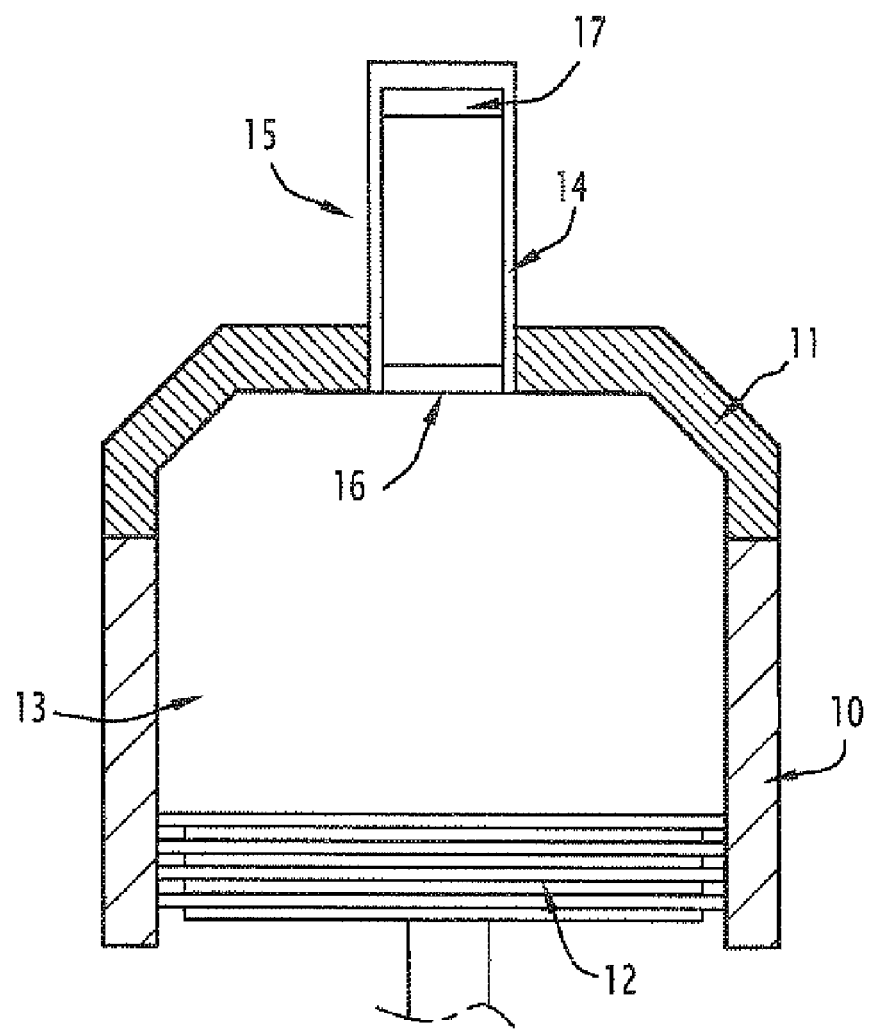
FIG. 2 illustrates the employment of such a sensor structure as a cylinder pressure sensor.

The incorporation of such a sensor structure into a cylinder pressure sensor for a motor vehicle is illustrated in FIG. 2.

In point of fact, an engine block 10 will be recognized in this FIG. 2, as well as a cylinder head 11, a piston 12, a combustion chamber 13 and a cylinder pressure sensor denoted by the general reference 14.

This sensor has, as has already been described, a sensor body 15 at one end of which a sensitive element 16 is placed, and at the other end of which a connecting circuit 17 is placed.

Figure 3:
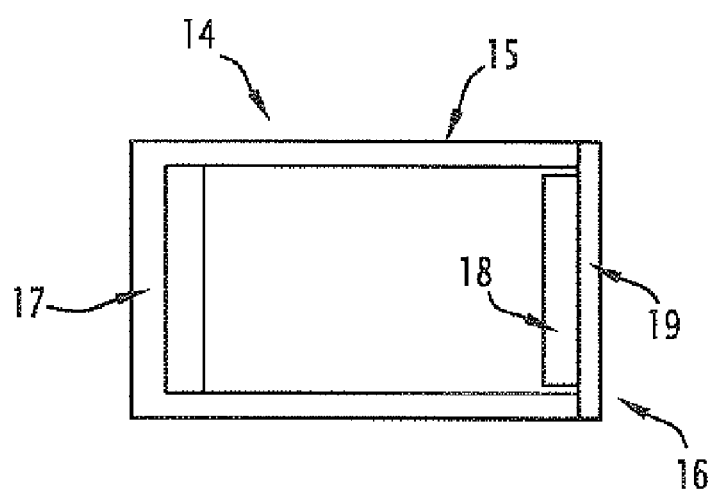
FIG. 3 shows such a sensor structure in a more detailed manner.

This sensor structure is illustrated in greater detail in FIG. 3, where identical reference numbers denote parts that are identical or similar to those described with respect to FIG. 2.

Thus, in this FIG. 3, the sensor 14 will be recognized with the sensor body 15, the sensitive element 16 and the circuit 17.

As previously explained, the sensitive element is then directly in contact with the combustion chamber and is subjected to a very high temperature and a very high pressure. The electronic circuit, that is to say the transmitter/receiver and possibly power supply means, is distinct from and separated from this sensitive element and then benefits from water cooling of the engine head.

A high temperature resistant piezoelectric material, such as for example AlN, can be used for producing the sensitive element of the sensor.

This sensitive element based on AlN is denoted by the general reference 18 in FIG. 3 and is for example placed on a flexible diaphragm 19 deforming with pressure.

Figure 4:
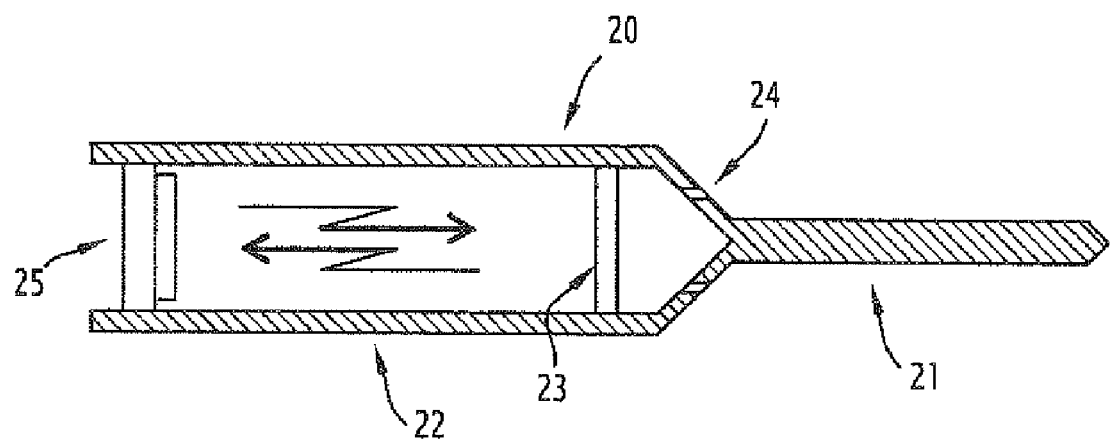
FIG. 4 illustrates the incorporation of such a sensor structure in a preheating plug.

The incorporation of such a sensor in a preheating plug of a diesel engine of a motor vehicle is illustrated in FIG. 4.

The plug is then denoted by the general reference 20 in this FIG. 4 and has a heating element denoted by the general reference 21. A sensor structure according to the invention denoted by the general reference 22 is also provided.

This sensor structure includes, in a conventional manner, a sensitive element 23 subjected for example to the pressure in the combustion chamber through communicating orifices provided in this preheating plug and denoted by the general reference 24.

The electronic circuit placed at the other end of the plug is for its part denoted by the general reference 25.

Figure 5:
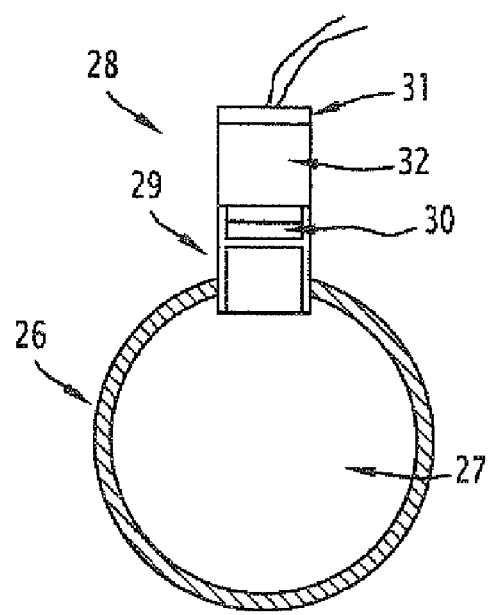
FIG. 5 illustrates the structure and operation of an exhaust pressure sensor using a sensor structure according to the invention.

Another application of such a sensor structure is illustrated in FIG. 5.

In this example, the sensor is an exhaust pressure sensor.

An exhaust pipe will be recognized in point of fact on this FIG. 5, denoted by the general reference 26, in which the exhaust gas passes, denoted by the general reference 27.

An exhaust pressure sensor denoted by the general reference 28 communicates with this pipe and this sensor comprises, in a conventional manner, a sensor body 29 at one end of which a sensitive element 30 is placed and at the other end of which a connecting circuit 31 is placed.

Means for protecting this electronic circuit are provided between the sensitive element and the circuit and are denoted by the general reference 32.

These means of protection are for example formed of a thermal insulator.

It will of course be evident that yet other embodiments can be envisaged.

Thus, for example, it is possible to group together several sensors on the same sensitive element, such as for example a pressure sensor, a temperature sensor, etc.

This will then make it possible to reduce the cost by using a mutual telecommunication and/or remote power supply device.

This will also make it possible for example to correct some drift in the sensitive element. This is for example the case for a combination of pressure and temperature sensors, by correcting the temperature drift.

It is also possible to envisage the use of, or combination with, a sensor sensitive to a gas, for example the measurement of oxygen richness inside the combustion chamber.

It will also be possible to envisage the use of, or combination with, a sensor sensitive to vibration, acceleration or impact, in order to make it possible, for example, to monitor the progress of combustion.

An element sensitive to two or more quantities selected from temperature, pressure, gas, vibration, acceleration or impact, can also be envisaged.

Various types of telecommunication devices can of course be envisaged, such as for example those using electromagnetic waves or radio frequencies, etc.

Similarly, remote power supply devices by electromagnetic waves or radio frequencies, etc. can also be envisaged.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A sensor structure, for a harsh environment in a motor vehicle, comprising:
a sensor body having, at one end, an element sensitive to the quantity to be measured in the harsh environment and, at another end, a connecting circuit for connecting the sensor body, placed outside the harsh environment, the sensor body and the circuit being physically separated from each other, and are connected by means for transmitting data without a connection, and between which means are provided that are permeable to data, for protecting the connecting circuit from the environment, the means for transmitting data additionally including means for remotely supplying the sensitive element, incorporated into the connecting circuit.

2. The structure according to claim 1, wherein the means for transmitting data comprise means for transmitting/receiving data by a radioelectric route or by electromagnetic coupling.

3. The structure according to claim 1, wherein the sensitive element is a pressure-sensitive element.

4. The structure according to claim 1 wherein the sensitive element is a temperature-sensitive element.

5. The structure according to claim 1 wherein the sensitive element is an element sensitive to a gas.

6. The structure according to claim 1 wherein the sensitive element is an element sensitive to vibrations, accelerations or impacts.

7. The structure according to claim 1 wherein the sensitive element is sensitive to two or more quantities among temperature, pressure, gas, vibration, acceleration or impact.

8. The structure according to claim 1, wherein the sensitive element is made of a piezoelectric material.

9. The structure according to claim 1, wherein the sensitive element is based on aluminum nitride.

10. The structure according to claim 2, wherein the sensitive element is a pressure-sensitive element.

11. The structure according to claim 2, wherein the sensitive element is a temperature-sensitive element.

12. The structure according to claim 2, wherein the sensitive element is an element sensitive to a gas.

13. The structure according to claim 2, wherein the sensitive element is an element sensitive to vibrations, accelerations or impacts.

14. The structure according to claim 2, wherein the sensitive element is sensitive to two or more quantities among temperature, pressure, gas, vibration, acceleration or impact.

15. The structure according to claim 2, wherein the sensitive element is made of a piezoelectric material.

16. The structure according to claim 3, wherein the sensitive element is made of a piezoelectric material.

17. The structure according to claim 4, wherein the sensitive element is made of a piezoelectric material.

18. The structure according to claim 5, wherein the sensitive element is made of a piezoelectric material.

19. The structure according to claim 6, wherein the sensitive element is made of a piezoelectric material.

20. The structure according to claim 5, wherein the sensitive element is based on aluminum nitride.

* * * * *